United States Patent [19]

Okutani et al.

[11] Patent Number: 4,623,253
[45] Date of Patent: Nov. 18, 1986

[54] POSITION DETECTING APPARATUS

[75] Inventors: Norio Okutani, Neyagawa; Kenichi Matsumura, Yamatokoriyama; Toshitsugu Inoue, Kyoto, all of Japan

[73] Assignee: Matsushita Electric Industrial Co., Ltd., Japan

[21] Appl. No.: 562,182

[22] Filed: Dec. 16, 1983

[30] Foreign Application Priority Data

Dec. 16, 1982 [JP] Japan .................................. 57-221408

[51] Int. Cl.[4] ............................................ G01B 11/14
[52] U.S. Cl. ...................................... 356/375; 901/47
[58] Field of Search ............... 250/230, 234, 235, 561, 250/557; 350/6.6; 356/373, 375, 399, 400; 358/208; 901/47

[56] References Cited

U.S. PATENT DOCUMENTS

| 3,448,284 | 6/1969 | Friesecke | 356/400 |
| 4,097,750 | 6/1978 | Lewis et al. | 356/400 |
| 4,327,959 | 5/1982 | Minoura et al. | 350/6.6 |
| 4,480,918 | 11/1984 | De Fazio | 356/375 |

FOREIGN PATENT DOCUMENTS

| 0141505 | 11/1981 | Japan | 356/375 |
| 0103009 | 6/1982 | Japan | 356/375 |
| 0103008 | 6/1982 | Japan | 356/375 |
| 1027457 | 4/1966 | United Kingdom . | |
| 475639 | 10/1975 | U.S.S.R. | 356/375 |

OTHER PUBLICATIONS

IBM Technical Disclosure Bulletin, vol. 15, No. 12, May 1973, pp. 3791-3792, New York, U.S., H. E. Korth et al.: "Position Detection of an Extended Light Spot". Proceedings of the Society of Photo-Optical Instrumentation Engineers, vol. 251, "Optical Alignment", Jul. 29-31, 1980, pp. 210-213, Washington, U.S., J. F. Hoose: Alignment System Devices for Medium Repetition Rate Glass Fusion Lasers, Figure captioned, Pointing Focusing Centering Sensor (P.F.C.), p. 211, first paragraph.

Primary Examiner—F. L. Evans
Assistant Examiner—Joel L. Harringa
Attorney, Agent, or Firm—Lowe, Price, Leblanc, Becker & Shur

[57] ABSTRACT

The image of an object is focused on a pair of photoelectric transducer arrays through a focusing lens, a beam splitter, and cylindrical lenses, the photoelectric transducer arrays having longitudinal axes extending substantially perpendicularly to each other. A scanning unit operates to move object images one-dimensionally over the photoelectric transducer arrays at an angle to the longitudinal axes thereof. A control unit is responsive to detected signals from the photoelectric transducer arrays and generates a scanning signal for the scanning unit for determining a two-dimensional position of the object with respect to the photoelectric transducer arrays. The beam splitter and the cylindrical lenses may be dispensed with, and the photoelectric transducer arrays may be replaced with a matrix of four photoelectric transducers.

4 Claims, 9 Drawing Figures

POSITION DETECTING APPARATUS

BACKGROUND OF THE INVENTION

The present invention relates to a position detecting apparatus for use in industrial robots.

In industrial robotics applications, there are instances where it is difficult to accurately position an object or workpiece to be machined or otherwise processed by an industrial robot. To cope with this problem, a position detector has been employed for gaining positional information of the workpiece.

One general type of such a position detector comprises an industrial camera, which requires a processing system having a sophisticated computing capability and is highly costly. Another position detector with a simplified processing system comprises a two-dimensional matrix of 2 by 2 photoelectric transducers. The image of an object is focused on the transducer matrix, and the detected signals from two adjacent photoelectric transducers are subtracted one from the other. If the focused object image is positioned intermediate between the two adjacent photoelectric transducers, then the difference d between the detected signals is expressed as $d \approx 0$. If the image is located near the position between the two adjacent phototransducers, then the signal difference d is expressed as $d >> 0$ or $d << 0$. If the image is positioned otherwise, then the signal difference d meets the relationship: $d \approx 0$. Based on this principle, the object can positionally be determined by employing a simple combination of logic circuits which detects when the difference d becomes 0 as it varies from $d >> 0$ to $d << 0$.

However, the conventional position detector with two-dimensional 2 by 2 photoelectric transducers needs a two-dimensional scanning system for scanning the photoelectric transducers, and suffers from a requirement for an extended period of time required for the two-dimensional scanning operation.

SUMMARY OF THE INVENTION

It is an object of the present invention to provide a position detecting apparatus having a one-dimensional scanning unit and a simplified processing sytem for detecting the two-dimensional position of an object through one-dimensional scanning of detector means.

According to the present invention, there is provided an apparatus for detecting an object, comprising a source of light for illuminating the object, means for focusing an image of the illuminated object, a beam splitter for dividing a beam of light emitted from the object, indicative of the image thereof and passing through the focusing means, into two beams of light each representing the image of the object, a pair of photodetectors responsive to the respective two beams of light for detecting the brightness of the object images focused thereon, a scanning unit for one-dimensionally moving the images over the photodetectors, a pair of condensing devices for condensing the divided beams in respectively transverse directions and control means responsive to detected signals from the detectors and generating a scanning signal for the scanning unit for determining a two-dimensional position of the object with respect to the photodetectors. Each of the photodetectors comprises an array of photoelectric transducers. The beam splitter and the cylindrical lenses may be dispensed with, and the photoelectric transducer arrays may be replaced with a matrix of four photoelectric transducers.

BRIEF DESCRIPTION OF THE DRAWINGS

The present invention will be described in detail by way of illustrative example with reference to the accompanying drawings, in which.

DETAILED DESCRIPTION

Figure 1:
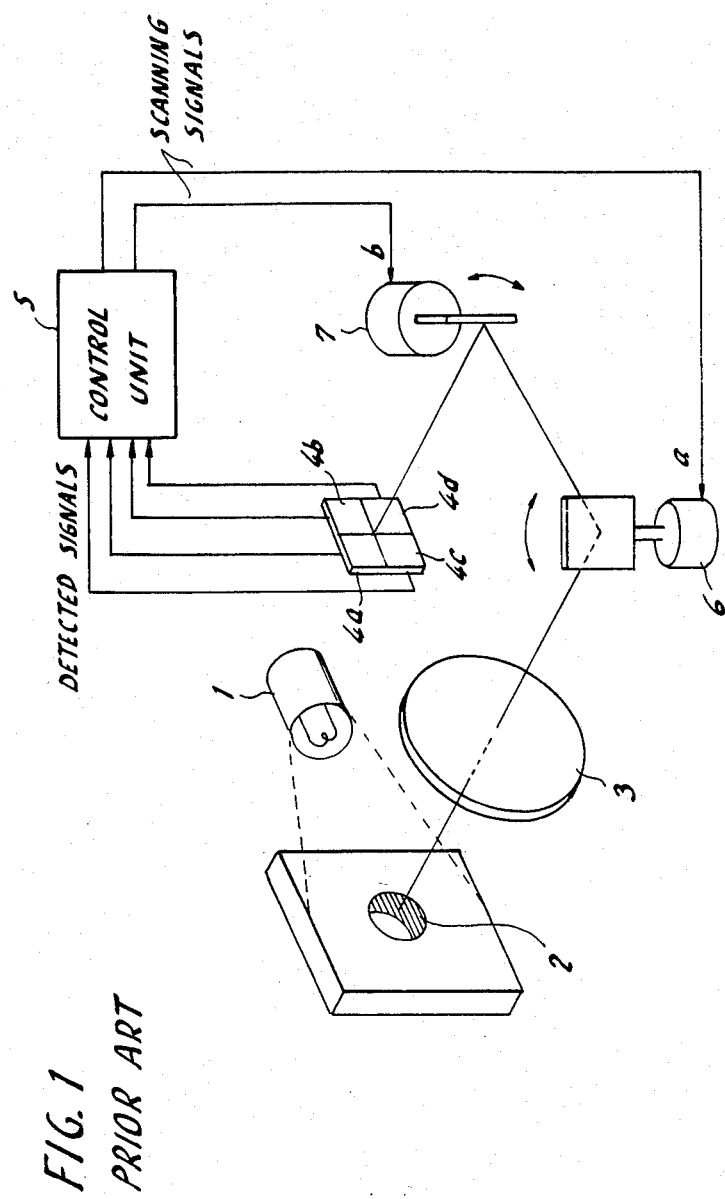
FIG. 1 is a schematic diagram of a conventional position detecting apparatus.
Figure 2:
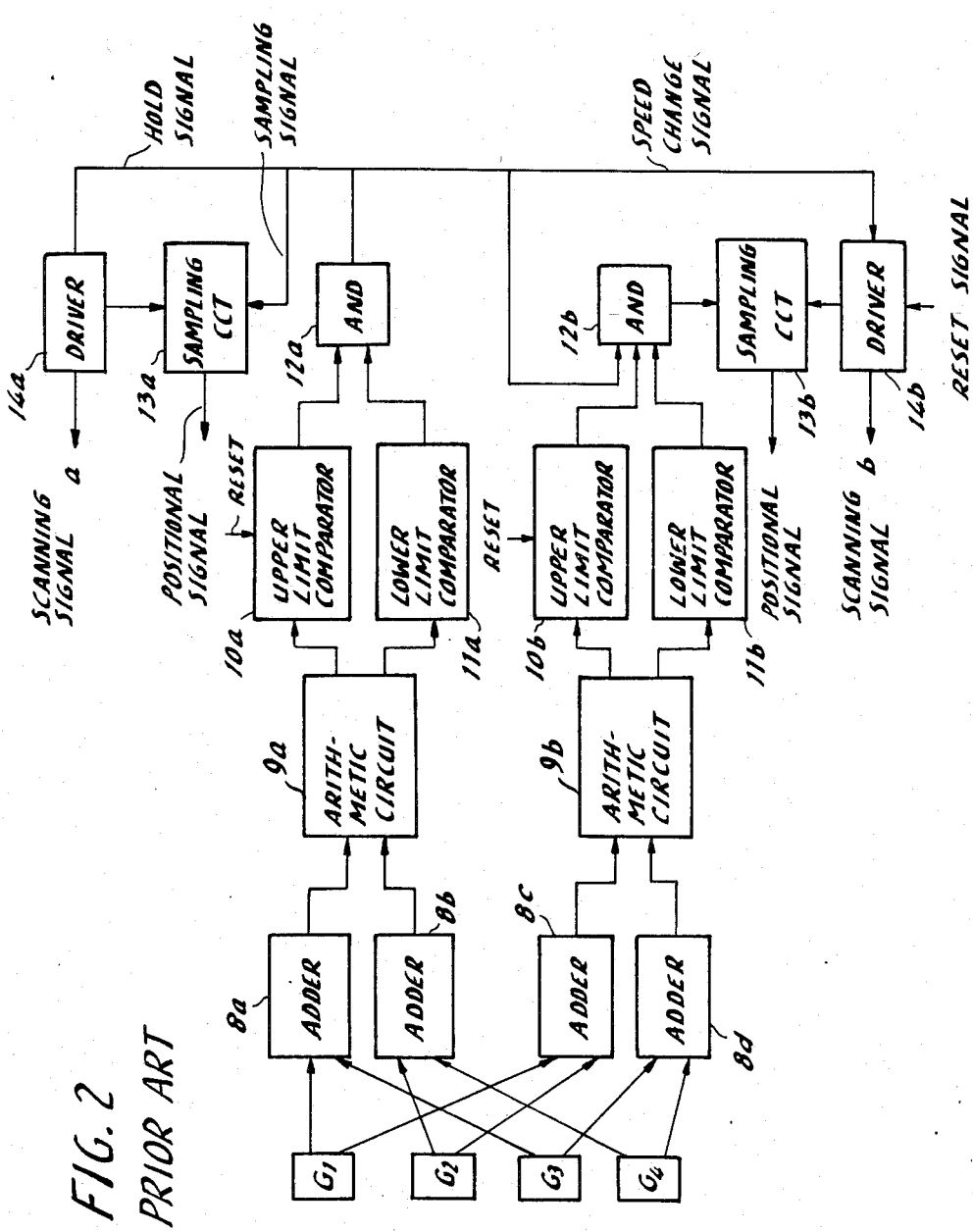
FIG. 2 is a block diagram of a control unit of the position detecting apapratus shown in FIG. 1.
Figure 3:
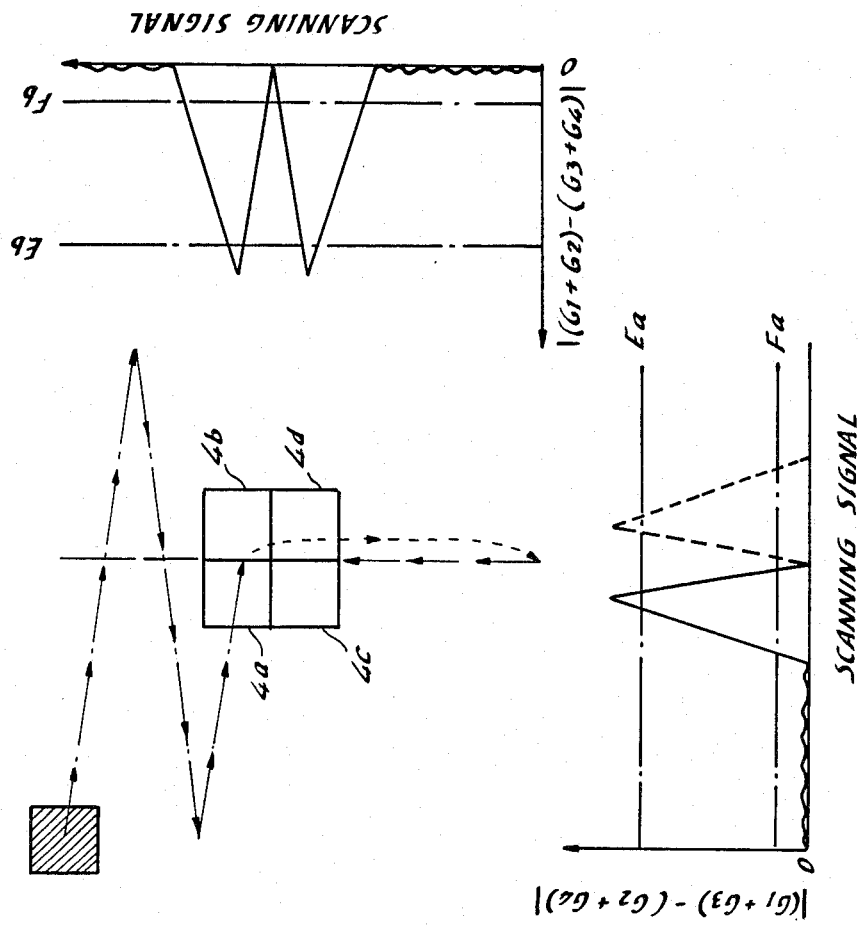
FIG. 3 is diagram showing the principle of operation of the prior position detecting apparatus.

FIGS. 1, 2 and 3 are illustrative of a conventional position detector using a matrix of two-dimensional 2 by 2 photoelectric transducers 4a, 4b, 4c, 4d on which the image of an object 2 illuminated by a light source 1 is focused through a focusing lens 3 and a pair of horizontally and vertically scanning galvanometers 6, 7. A control unit 5 includes a pair of driver circuits 14a, 14b which issue scanning signals to the horizontally and vertically scanning galvanometers or scanning units 6, 7, respectively, for actuating the galvanometers so that the image formed on the transducer matrix will move in a triangular pattern, that is, horizontally at a speed Va and vertically at a speed Vb, the speeds being selected to meet the relationship: $Va >> Vb$. The photoelectric transducers 4a, 4b, 4c, 4d issue detected signals G1, G2, G3, G4, respectively, to a pair of adders 8a, 8b, and the sums of the signals are then applied to an arithmetic circuit 9a which produces a signal indicative of $|(G1+G3)-(G2+G4)|$ which is delivered to an upper-limit comparator 10a and a lower-limit comparator 11a. When the image of the object 2 is positioned over the photoelectric transducers 4a, 4c, the upper-limit comparator 10a compares the signal from the arithmetic circuit 9a with a signal indicative of Ea selected in advance to be $Ea >> 0$, and issues a signal as $|(G1+G3)-(G2+G4)| > Ea$. When the object image is positioned midway between the photoelectric transducers 4a, 4c and 4b, 4d, the lower-limit comparator 11a compares the signal from the arithmetic circuit 9 with a signal representative of Fa selected in advance to be $Fa \approx 0$, and issues a signal as $|(G1+G3)-(G2+G4)| < Fa$. In response to the signals from the upper-limit comparator 10a and the lower-limit comparator 11a, an AND gate 12a issues a sampling signal to a sampling circuit 13a, a hold signal to the driver circuit 14a, a speed-change signal to the driver circuit 14b, and a signal to an AND gate 12b. The sampling signal 13a is responsive to the sampling signal for reading the scanning signal issued from the the driver circuit 14a at this time and issuing a positional signal representing the direction in which the photoelectric transducers 4a, 4b are arrayed. The driver circuit 14a is responsive to the hold signal for holding the scanning signal applied at the time to thereby stop the movement of the image. The driver circuit 14b is responsive to the speed-change signal for changing the vertical scanning speed Vb so that Vb=Va.

Simultaneously, the detected signals G1, G2, G3, G4 from the photoelectric transducers 4a, 4b, 4c, 4d, respectively, are applied to adders 8c, 8d, and the sums are supplied to an arithmetic circuit 9b which issues a signal indicating $|(G1+G2)-(G3+G4)|$. This difference signal is compared with values Eb, Eb in an upper-limit comparator 10b and a lower-limit comparator 11b, respectively, in the same manner as described above. Signals from the upper- and lower-limit comparators 10b, 11b, together with the signal from the AND gate 12a, are applied to the AND gate 12b which then issues a sampling signal to a sampling circuit 13b. In response to the applied sampling signal, the sampling circuit 13b reads the scanning signal issued from the driver circuit 14b at this time and issues a positional signal indicative of the direction in which the photoelectric transducers 4a, 4c are arrayed. When the image of the object 2 is thereafter moved to and over the photoelectric transducers 4a, 4b, the difference signal becomes $|(G1+G2)-(G3+G4)|>$Eb again, whereupon no output signal is issued from the lower-limit comparator 10b, and reset signals are applied to the upper-limit comparator 10a and the driver circuit 14b. In response to the reset signal, the upper-limit comparator 10a stops generation of its output signal, allowing the driver circuit 14b to alter the vertical scanning speed Vb to meet the relationship: Va>>Vb.

With the above prior position detector arrangement, the image focused on the two-dimensional matrix of photoelectric transducers must be moved by a two-dimensional scanning system, and the two-dimensional scanning operation requires a prolonged time to generate necessary signals for positional detection.

The present invention will now be described with reference to FIGS. 4 through 8.

Figure 4:
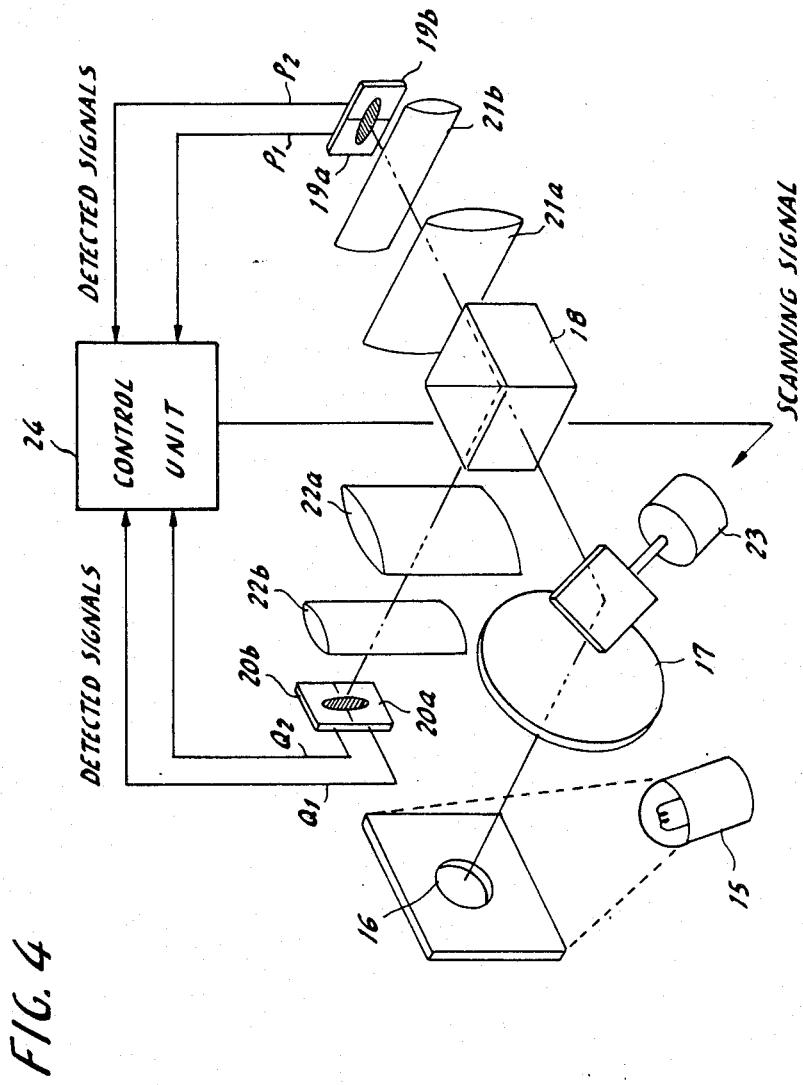
FIG. 4 is a schematic diagram of a position detecting apparatus according to an embodiment of the present invention.

FIG. 4 illustrates a position detecting apparatus according to an embodiment of the present invention. The position detecting apparatus includes a light source 15 for illuminating an object 16 and a focusing lens 17 for focusing the image of the object 16. A beam splitter 18 serves to divide the beam of image light from the focusing lens 17 into two beams which are focused respectively on two arrays of photoelectric transducers 19a, 19b and 20a, 20b, the arrays being oriented perpendicularly to each other. Between the beam splitter 18 and the array of photoelectric transducers 19a, 19b, there is disposed a pair of spaced cylindrical lenses 21a, 21b serving as image condensing means having axes extending in alignment with the direction in which the photoelectric transducers 19a, 19b are arrayed. Likewise, a pair of spaced cylindrical lenses 22a, 22b is disposed between the beam splitter 18 and the array of photoelectric transducers 20a, 20b and having axes extending in alignment with the direction in which the photoelectric transducers 20a, 20b are arrayed.

The focusing lens 17 and the cylindrical lenses 21a, 21b, 22a, 22b have focal points selected such that the magnification of the image is 1/M in the direction in which the photoelectric transducers are arrayed with $L<2l_1 M$, the magnification of the image is 1/N in the direction normal to the foregoing direction, and the ratio of image condensing is M/N<<1, where $l_1$ is the length of each photoelectric transducer in the axial direction of the array and L is the length of the object 16.

A galvanometer or scanning unit 23 serving as a scanning unit is disposed betwen the focusing lens 17 and the beam splitter 18. The galvanometer 23 is driven by a scanning signal issued from a control unit 24 to move the object image obliquely to the directions of the arrays of photoelectric transducers 19a, 19b and 20a, 20b. To this end, the galvanometer 23 is tilted so that the axis of swinging movement of the galvanometer 23 and a plane normal to the optical axis of the focusing lens 17 form an angle $\theta$ therebetween clockwise as shown in FIG. 4.

Figure 5A:
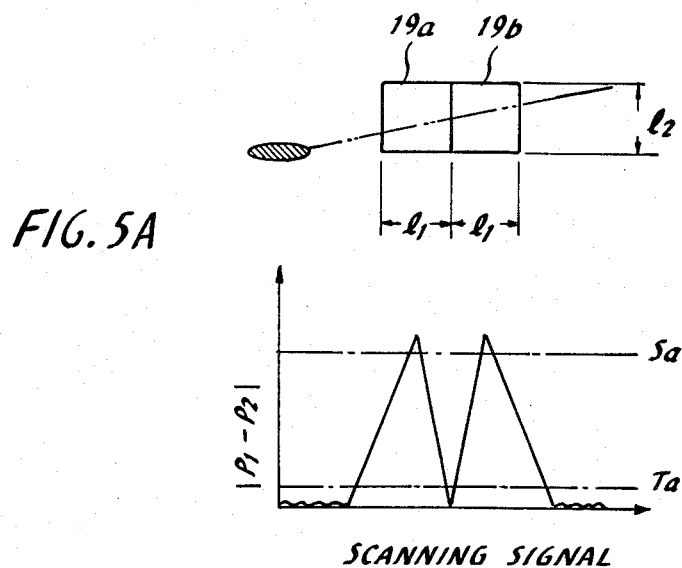
FIGS. 5A and 5B are diagrams illustrative of the principle of operation of the position detecting apparatus shown in FIG. 4.
Figure 5B:
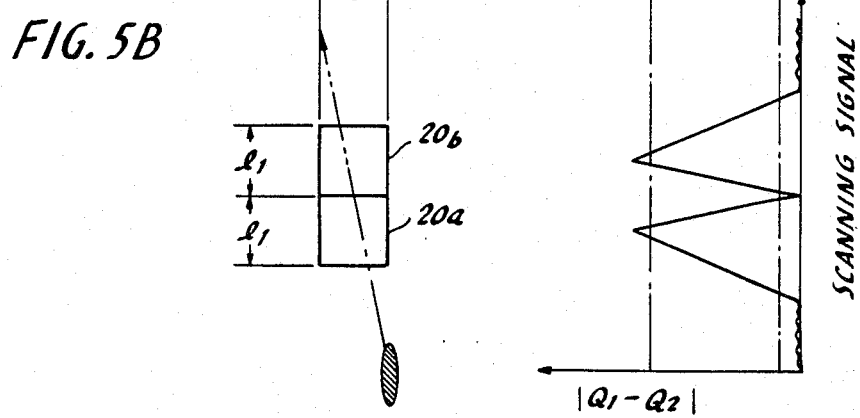

The principle of operation to determine the position of the object 16 will be described with reference to FIG. 5.

Since the images on the arrays of photoelectric transducers 19a, 19b and 20a, 20b are compressed in the direction perpendicular to the axes of the transducer arrays, the images are positioned in the widths expressed respectively by $l_2 \sin \theta N$, $l_2 \cos \theta N$ where $l_2$ is the length of each photoelectric transducer in the direction normal to the axis of the array, and hence can traverse the central lines of the arrays of photoelectric transducers 19a, 19b and 20a, 20b. The differences (P1−P2), (Q1−Q2) are found between detected signals P1, P2 and Q1, Q2 indicative of the brightness of the image and generated from the photoelectric transducers 19a, 19b, 20a, 20b. When the image of the object 16 is positioned intermediate between the photoelectric transducers 19a, 19b, the difference P1−P2 is expressed as P1−P2≈0. When the image is positioned intermediate between the photoelectric transducers 20a, 20b, the difference Q1−Q2 is expressed as Q1−Q2≈0. When the image is located near such intermediate positions, the differences $|P1-P2|$, $|Q1-Q2|$ meet the relationships: $|P1-P2|>>0$, $|Q1-Q2|>>0$. When the image is positioned otherwise, P1−P2≈0 and Q1−Q2≈0.

Figure 6:
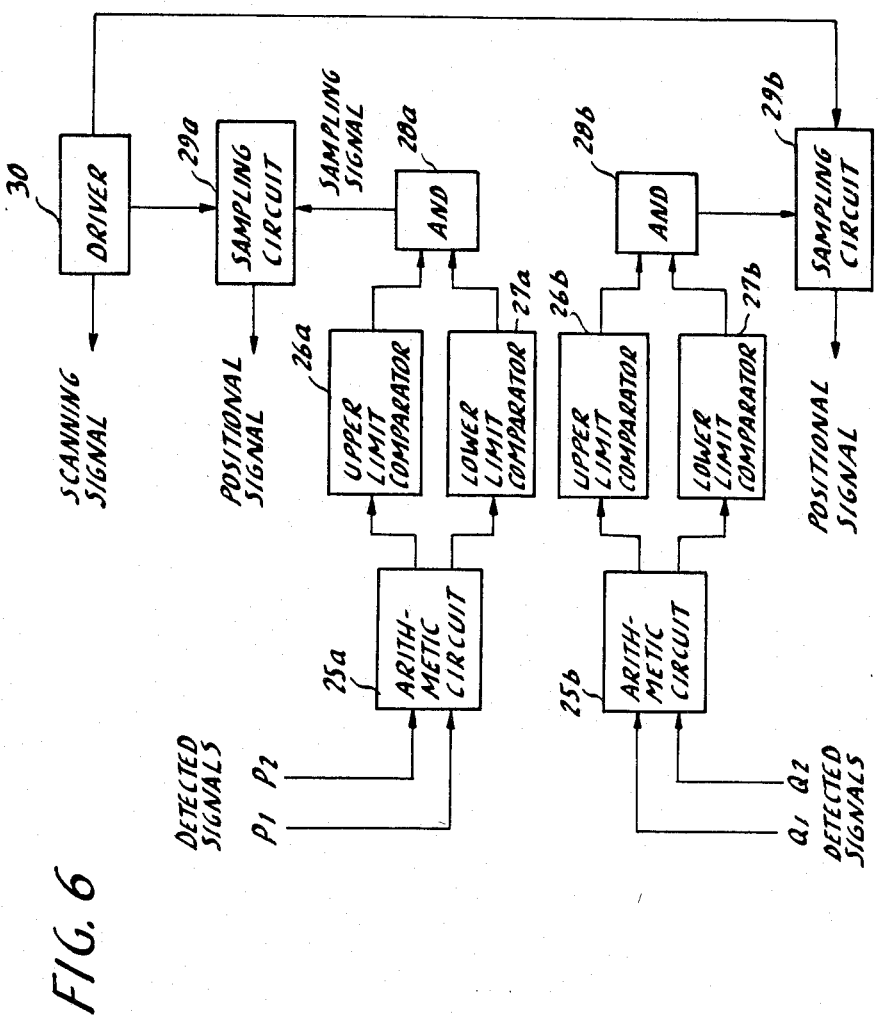
FIG. 6 is a block diagram of a control unit of the position detecting apparatus of FIG. 4.

The control unit 24 is illustrated in FIG. 6. The control unit 24 comprises a pair of arithmetic circuits 25a, 25b, a pair of upper-limit comparators 26a, 26b, a pair of lower-limit comparators 27a, 27b, a pair of AND gates 28a, 28b, a pair of sampling circuits 29a, 29b, and a driver circuit 30. The detected signals P1, P2 from the photoelectric transducers 19a, 19b are processed by the arithmetic circuit 25a, which issues a signal indicative of $|P1-P2|$. To the arithmetic circuit 25a are connected the upper-limit comparator 26a and the lower-limit comparator 27a. The upper-limit comparator 26a issues an output signal during an interval of time beginning when the input signal $|P1-P2|$ exceeds a certain value and ending when it exceeds the value at a next time. The upper-limit comparator 26a may comprise a comparator and a T flip-flop. The lower-limit comparator 27a issues an output signal when the input signal $|P1-P2|$ is lowered below a certain value. The output signals from the upper-limit comparator 26a and the lower-limit comparator 27a are fed to the AND gate 28a, which applies a sampling signal to the sampling circuit 29a connected to the driver circuit 30 that issues a scanning signal. The sampling circuit 29a is responsive to the sampling signal for reading the scanning signal from the driver circuit 30 and issuing a positional signal. Likewise, the sampling circuit 29b issues a positional signal through the same operation as above to process the detected signals Q1, Q2 from the photoelectric transducers 20a, 20b.

Operation of the position detecting apparatus thus constructed is as follows:

The driver circuit 30 issues a scanning signal to drive the galvanometer 23 for moving the images focused on the arrays of photoelectric transducers 19a, 19b and 20a, 20b at an angle of $\tan^{-1}(\tan\theta/N)$ to the axes of the arrays of photoelectric transducers 19a, 19b and 20a, 20b. The detected signals P1, P2 from the photoelectric transducers 19a, 19b are applied to the arithmetic circuit 25a which then produces the signal of $|P1-P2|$. When the image of the object 16 is positioned on the photoelectric transducer 19a, the upper-limit comparator 26a compares the signal from the arithmetic circuit 25a with a signal Sa (Sa>>0) and issues a signal since $|P1-P2|>$Sa. When the image is located intermediate between the photoelectric transducers 19a, 19b, the lower-limit comparator 27a compares the signal from the arithmetic circuit 25a with a signal Ta (Ta≈0) and issues a signal since $|P1-P2|<$Ta. In response to the output signals from the upper- and lower-limit comparators 26a, 27a, the AND gate 28a delivers a sampling signal to the sampling circuit 29a, which then reads the scanning signal from the driver circuit 30 and issues a positional signal indicative of the direction in which the photoelectric transducers 19a, 19b are arrayed. When the image is then positioned on the photoelectric transducer 19b, the signal from the upper-limit comparator 26a is eliminated since $|P1-P2|>$Sa again. The detected signals Q1, Q2 from the photoelectric transducers 20a, 20b are processed in the same manner as described above to enable the sampling circuit 29b to issue a positional signal representative of the direction in which the photoelectric transducers 20a, 20b are arrayed.

Figure 7:
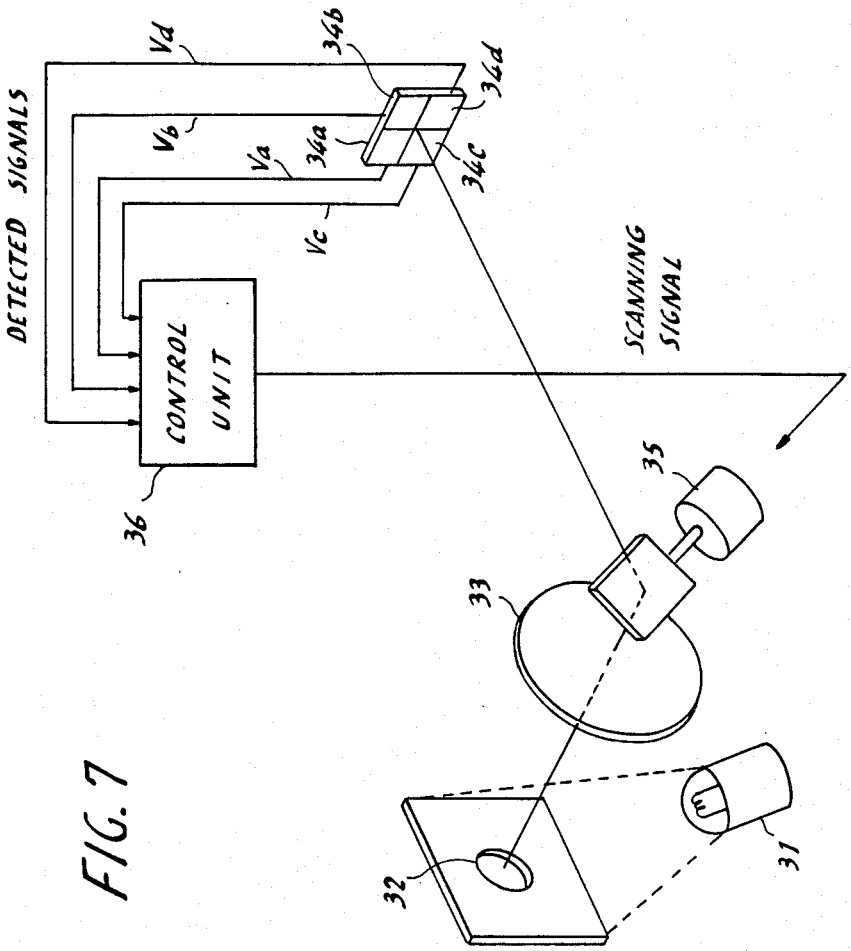
FIG. 7 is a schematic diagram of a position detecting apparatus according to a second embodiment of the present invention.
Figure 8:
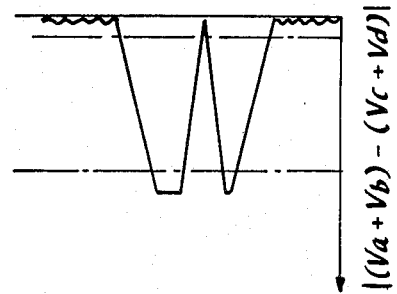
FIG. 8 is a diagram illustrating the principle of operation of the position detecting apparatus shown in FIG. 7.
Figure 8:
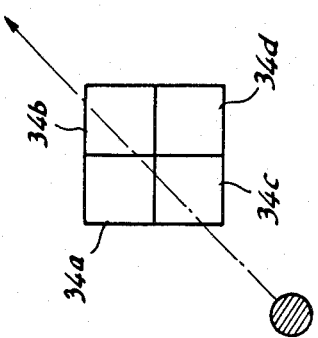
Figure 8:
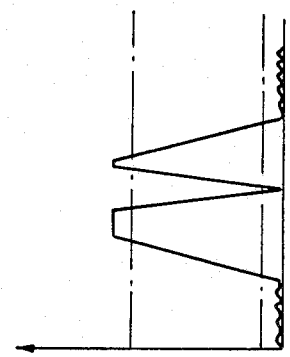

FIGS. 7 and 8 are illustrative of a position detecting apparatus according to another embodiment of the present invention. The position detecting apparatus comprises a light source 31 for illuminating an object 32, a focusing lens 33 for focusing a beam of image light from the object 32 onto a two-dimensional matrix 34 of 2 by 2 photoelectric transducers 34a, 34b, 34c, 34d, a galvanometer or scanning unit 35 for one-dimensionally moving the beam of image light over the matrix 34 at an angle to axes thereof or diagonally as shown, and a control unit 36 responsive to detected signals Va, Vb, Vc, Vd from the photoelectric transducers 34a, 34b, 34c, 34d for issuing a scanning signal to the galvanometer 35. Operation of the position detecting apparatus shown in FIG. 7 is substantially the same as that of the position detecting apparatus of FIG. 4 as is apparent from FIG. 8.

The position detecting apparatus of FIG. 7 has no image condensing means and no beam splitter and is suitable for an application in which the scanning width may be reduced with the image condensing ratio being M/N=1.

Although certain preferred embodiments of the present invention have been shown and described in detail, it should be understood that various changes and modifications may be made therein without departing from the scope of the appended claims.

What is claimed is:

1. An apparatus for detecting an object, comprising:
   (a) a source of light for illuminating the object;
   (b) focusing means for focusing an image of said illuminated object;
   (c) a beam splitter for dividing a beam of light emitted from said object indicative of the image thereof and passing through said focusing means into the beams of light each representing the image of the object;
   (d) a pair of photodetectors responsive to said respective two beams of light for detecting the brightness of the object images focused thereon;
   (e) a scanning means for one-dimensionally moving the images over said respective photodetectors, said scanning means being inclined with respect to said focusing means so that the images focused on said photodetors are inclined through an angle;
   (f) first and second condensing means for condensing said divided two beams in first and second directions with respect to the image, respectively, said first direction being normal to said second direction; and
   (g) control means for generating a scanning signal for driving said scanning means and for determining a two-dimensional position of said object on the basis of said scanning signal and detected signals from said photodectors.

2. An apparatus according to claim 1, wherein each of said photodetectors comprise an array of photoelectric transducers attached to each other, the arrays of photoelectric transducers having longitudinal axes extending substantially perpendicularly to each other.

3. An apparstus according to claim 1, wherein each of the photodetectors has a longitudinal axis and each of the first and second condensing means comprises at least one cylindrical lens disposed between said beam splitter and one of said detectors and having a longitudinal axis extending substantially parallel to said longitudinal axis of the detector.

4. An apparatus for detecting an object, comprising:
   (a) a source of light for illuminating the object;
   (b) focusing means for focusing an image of said illuminated object;
   (c) a matrix of four photodectors responsive to a beam of light emitted from the object and passed through said focusing means for detecting the brightness of the object image focused thereon;
   (d) a scanning means for one-dimensionally moving the image over said matrix of photodetectors said scanning means being inclined with respect to said focusing means so that the image focused on said matrix of photodetectors is inclined through an angle; and
   (e) control means for generating a scanning signal for driving said scanning means, and for determining a two-dimensional position of said object on the basis of said scanning signal and detected signals from said photodetectors.

* * * * *